United States Patent Office 3,345,423
Patented Oct. 3, 1967

---

3,345,423
META-SUBSTITUTED HALOBENZENES
William S. Tolgyesi, Sarnia, Ontario, Canada, assignor to The Dow Chemical Company, Midland, Mich., a corporation of Delaware
No Drawing. Filed Sept. 28, 1964, Ser. No. 399,871
13 Claims. (Cl. 260—650)

This invention relates to a process for the removal of halobenzenes which contain at least one substituent in an ortho and/or para position from a mixture containing such compounds and at least one halobenzene compound with one or more substituents in any of the meta positions. More particularly, the present invention relates to the production of halobenzene compounds containing at least one bromine atom in any of the meta positions substantially free from the corresponding ortho-bromo- and para-bromo-substituted compounds.

It is known that mixtures of isomeric dibromobenzenes rich in the meta isomer may be prepared by reacting benzene and bromine in the presence of aluminum bromide catalyst at temperatures of from about 40° to 120° C. Such a process is disclosed in U.S. Patent 3,062,899 to Sax. In these prior art processes, however, the reaction product obtained contains no more than about 80–85 percent meta-dibromobenzene with the remainder consisting of 5–6 percent ortho isomer and 9–15 percent para isomer. To obtain the meta isomer in substantially pure form by physical methods from such an isomeric mixture is both costly and very difficult. For example, fractional distillation of such an isomeric mixture is impractical because the boiling points of the dibromobenzene isomers are all in a range of from 218° to 221° C.

A chemical method for the preparation of meta-dihalobenzenes of high purity is known. Diazotization of meta-bromoaniline followed by treatment of the diazotized product with cuprous bromide (Sandmeyer reaction) gives meta-dibromobenzene (free of the ortho isomer and para isomer) as the final product. Because of the process steps involved, however, the cost of the use of such a method in a commercial operation would be prohibitively high.

The process of the present invention is based upon the different rates of reaction involved when benzene (or any other aromatic hydrocarbon of equal or greater basicity) is reacted with a mixture of halobenzenes which contain at least one bromine substituent in the ortho, para and meta positions with respect to the other ring substituents (including other halogen atoms). The transbromination (or disproportionation) reaction between an aromatic hydrocarbon and a substituted benzene compound which contains a bromine substituent in the meta position is considerably slower than the reaction between the same aromatic hydrocarbon and a substituted benzene compound with a bromine atom in the ortho or para positions when conducted in the presence of a Friedel-Crafts catalyst. The ortho- and/or para-substituted halobenzenes are therefore converted into materials which do not contain bromine substituents in the ortho and para positions with respect to the other substituents (which may be other halogen atoms) before a similar reaction with the meta-bromo-substituted benzene is complete. The reactions involved may be illustrated as follows:

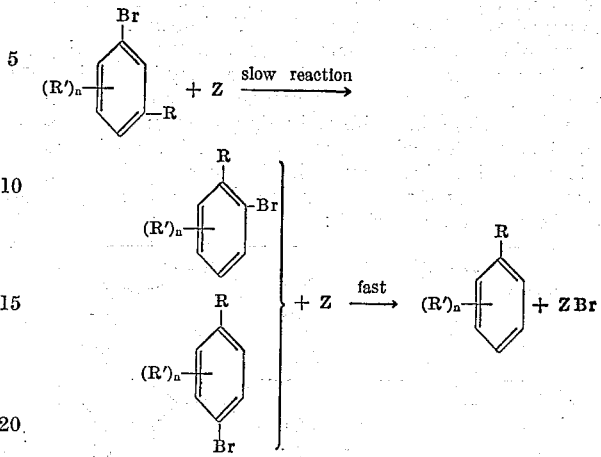

wherein Z is an aromatic bromine acceptor of from 6 to 15 carbon atoms such as benzene, diphenyl, naphthalene or an alkyl-substituted benzene, $n$ is an integer of from 0 to 1 representing the number of substituents R' attached to the benzene ring (replacing a hydrogen atom when $n$ is 1) and each of R and R' may be a halogen atom (Cl, Br, F), a phenyl group, a halophenyl group, a phenoxy group or a halophenoxy group. As soon as the ortho- and/or para-bromine substituents have been removed by the transhalogenation reaction (which is carried out using an aromatic hydrocarbon bromine acceptor in the presence of a Friedel-Crafts catalyst), the remaining meta-bromo-substituted benzene compound is substantially free of the ortho-bromo- and para-bromo benzene compounds and may then be separated from the reaction mixture. If the end use of the product requires only the elimination of the ortho- and para-bromobenzene compounds, it is not necessary to separate the meta constituents. In this case, the transhalogenation reaction may be slowed or stopped (for example, by the removal or destruction of the Friedel-Crafts catalyst, or by removal of the benzene reactant) and the reaction product used without separation of the meta-bromobenzene compound.

By "meta-bromobenzene compound" or "a meta-bromobenzene," as used herein, is meant any compound containing a benzene nucleus with at least one bromine substituent in one of the meta positions with respect to another non-alkyl ring substituent. The other ring substituent may be another halogen atom, a phenyl group or a phenoxy group. Thus, the following compounds are "meta-bromobenzene compounds":

Similarly, ortho- and para-bromobenzene compounds contain at least one bromine atom in the corresponding positions with respect to another substituent. Alkyl substituents tend to migrate and the terms "ortho-, meta- and para-bromobenzenes" do not include compounds with an alkyl group and a bromine atom attached to the same benzene nucleus. Alkylbenzene compounds are suitable bromine acceptors, however.

The bromine acceptor is preferably an aromatic hydrocarbon of from 6 to 15 carbon atoms such as benzene, diphenyl, naphthalene or an alkyl-substituted benzene compound (preferably a lower alkyl-substituted benzene compound with from 1 to 5 alkyl substituents).

According to the present invention, the following typical meta-bromo-substituted benzenes may be obtained from mixtures containing aromatic compounds with bromine atoms in the ortho and para positions: (1) halophenyl ethers (especially bromophenyl ethers) wherein at least one bromine atom is in the meta position with respect to one or more substituent groups (a phenoxy or halophenoxy group) such as:

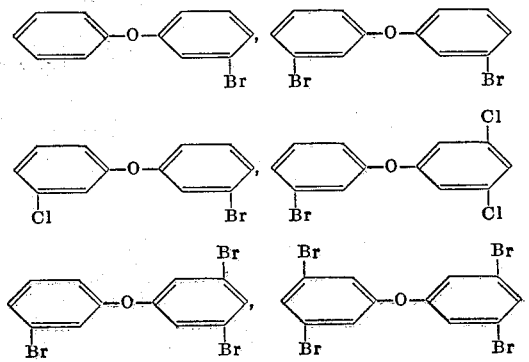

Generically, such compounds may be represented by the Formulae I and II:

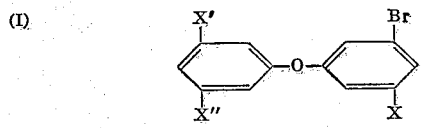

wherein each of X, X' and X'' are independently selected from the group consisting of H, F, Cl and Br atoms.

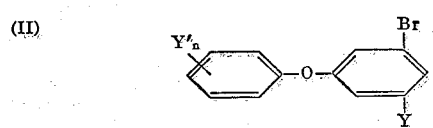

wherein Y is selected from the group consisting of H, F, Cl and Br atoms, Y' is an F or Cl atom and $n$ is an integer of from 1 to 5.

(2) meta-bromobiphenyls such as:

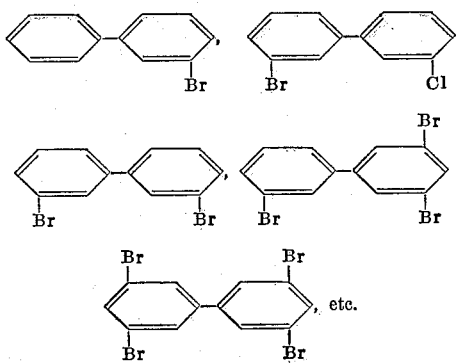

(3) symmetrical trihalobenzenes of the formula

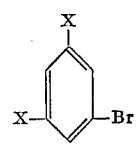

wherein X is a F, Cl or Br atom such as:

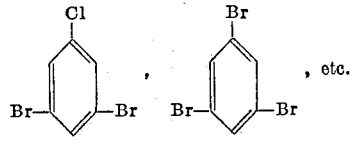

Thus, to isolate a symmetrical tribromobenzene and meta-dibromobenzene from a mixture containing isomers and other para- and ortho-substituted halobenzenes and monobromobenzene according to (3), the following reaction sequence would occur (using benzene as the bromine acceptor):

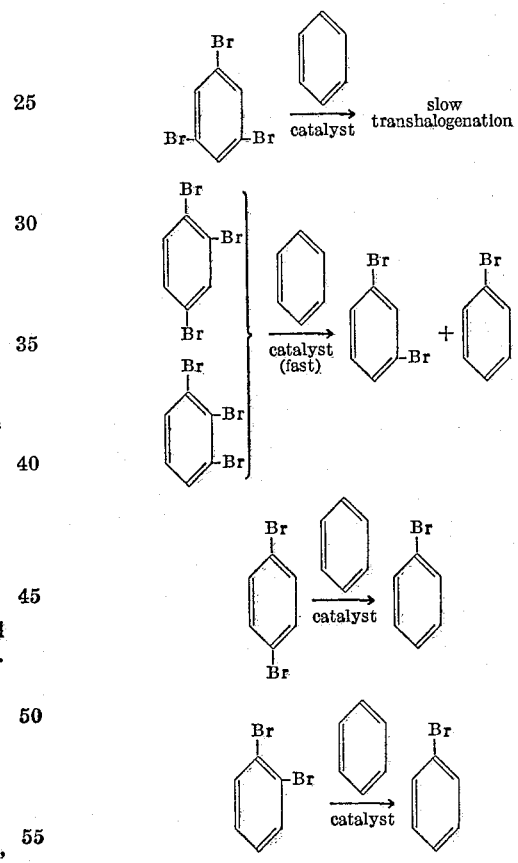

giving an ultimate reaction mixture free of ortho- or para-substituted bromobenzenes and composed primarily of excess benzene, monobromobenzene, m-dibromobenzene and sym-tribromobenzene. In the above reactions, it is to be understood that all of the materials to the left of the arrow are present in the same reaction mixture.

The removal of ortho-bromofluorobenzene and para-bromofluorobenzene from an isomeric mixture of bromofluorobenzenes using toluene as the bromine acceptor is carried out according ot the following reactions:

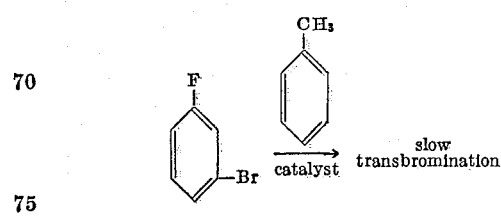

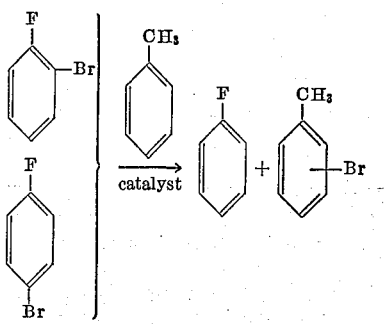
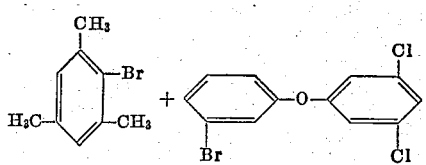

When toluene is used as the bromine acceptor in these reactions, the metal-bromofluorobenzene can be separated from the reaction mixture by conventional distillation techniques.

Thus, the following specific mixtures may be separated by contacting the mixtures with benzene or an alkylbenzene (preferably of from 7 to 10 carbon atoms) in the presence of a Friedel-Crafts catalyst:

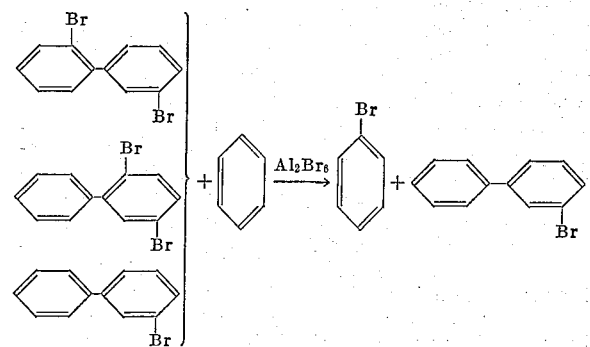

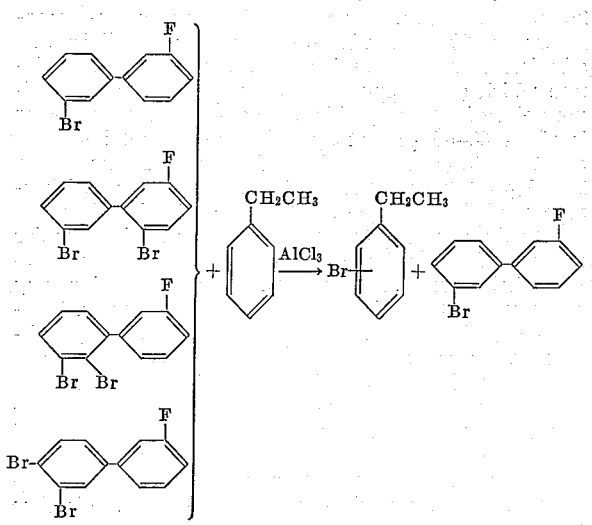

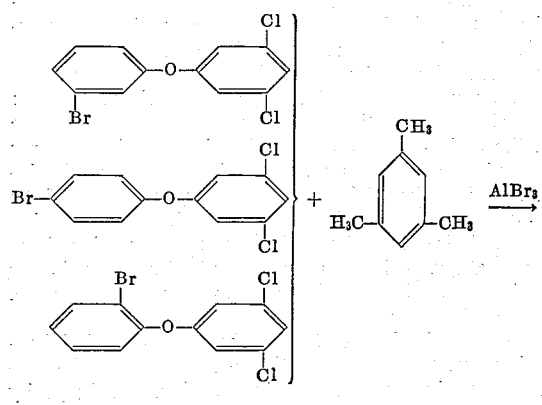

In the above reactions, the material in brackets represents the starting mixtures and the material to the right of the arrow represents the product mixture obtained after transbromination. Similar separations can be made with other mixtures. In addition, other bromine acceptors may be used such as alkylbenzenes of the formula

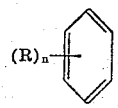

wherein $n$ is an integer of from 1 to 3 and R is a lower alkyl group of from 1 to 4 carbon atoms. Examples of such acceptors include toluene, durene, ethylbenzene, cumene, xylene, mesitylene, etc.

In a particular embodiment of the process of the invention, it has been found that meta-bromohalobenzenes may be obtained in substantially pure form from a mixture containing ortho-, para- and meta-bromohalobenzenes by the addition of an aromatic hydrocarbon (such as benzene or alkylbenzenes) and a Friedel-Crafts catalyst (such as an aluminum halide or iron halide) to the mixture to initiate a transhalogenation reaction between the aromatic hydrocarbon and the isomeric bromohalobenzenes. This reaction is allowed to continue until a substantial portion of the aromatic hydrocarbon, ortho-bromohalobenzenes and para-bromohalobenzenes have been converted to the corresponding monohalobenzenes. At this point, the reaction is slowed or stopped by any convenient method, such as the separation of the catalyst from the reaction mixture or other means. In the case of a catalyst such as an aluminum halide, the catalyst may be destroyed and the reaction stopped entirely by simply adding water. The resulting reaction mixture may then be treated by conventional separation methods to remove the meta-bromohalobenzenes. The reaction may be slowed after conversion of the para- and ortho-bromohalobenzenes to the corresponding monohalobenzenes by simply reducing the temperature.

The meta-bromohalobenzenes obtained by this embodiment of the process of the invention are essentially free of ortho-bromohalobenzene and para-bromohalobenzene isomers. Meta-bromohalobenzene compounds with a purity greater than 99 percent have been obtained according to the process of the invention. The phrase "meta-bromohalobenzene compound" is meant to include such compounds as m-bromochlorobenzene, m-dibromobenzene, m-bromofluorobenzene, etc.

Thus, in this specific embodiment of the process of the invention, the transhalogenation (disproportionation) reaction of meta-bromohalobenzenes and benzene or alkylbenzene (to produce the corresponding monohalobenzene) is much slower than the reaction of the para- and ortho-bromohalobenzenes with benzene or alkylbenzene in the presence of a Friedel-Crafts catalyst. Therefore, all of the ortho-bromohalobenzenes and para-bromohalobenzenes are converted to the monohalobenzenes before any substantial amount of the meta-bromohalobenzene has reacted. As soon as the unwanted ortho and para isomers are converted, the transhalogenation reaction is slowed or stopped to prevent the further destruction of the meta-bromohalobenzene. The reaction mixture then contains meta-bromohalobenzene (no longer in admixture with the ortho and para isomers) and other compounds such as benzene (or alkylbenzene,) monohalobenzenes and perhaps a few higher polyhalobenzenes (such as bromodihalobenzenes). The pure meta-bromohalobenzene compound is then separated from this mixture by conventional separation techniques. When the bromine acceptor used is benzene, the benzene-monohalobenzene mixture remaining after separation from the meta-bromohalobenzene can be recycled (either with or without removal of the benzene) and treated with more halogen to produce additional amounts of isomeric bromohalobenzenes. These isomeric bromohalobenzenes are then treated with more benzene to convert the ortho- and para-bromohalobenzenes to the corresponding monohalobenzenes and the meta-bromohalobenzene continuously separated from the mixture.

Another particularly advantageous embodiment of the invention involves a combination of process steps for the continuous production of an essentially pure meta-bromohalobenzene (such as meta-dibromobenzene or meta-bromochlorobenzene) using benzene, a halogen (such as bromine and/or chlorine) and a suitable catalyst as process raw materials.

In the first step of this embodiment of the process, an isomeric mixture of bromohalobenzenes is produced by the reaction of benzene or halobenzene and bromine in the presence of a catalyst according to the following typical equations:

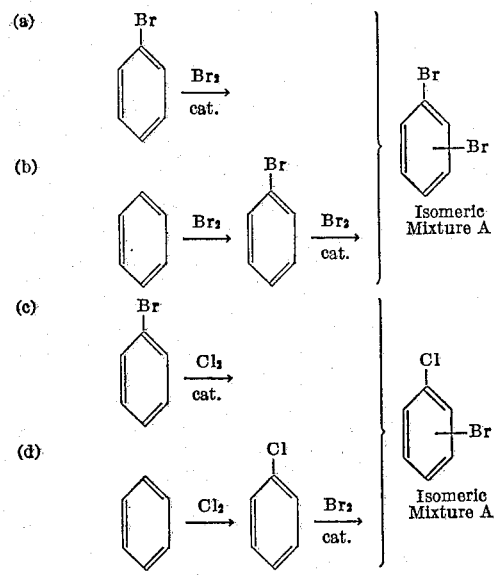

Equations *a* and *b* lead to the preparation of an isomeric equilibrium mixture of ortho-, meta- and para-dibromobenzene. Monobromobenzene from reaction (*b*) may be chlorinated according to reaction (*c*) to give an isomeric mixture of ortho-, meta- and para-bromochlorobenzene. This isomeric mixture may also be obtained from the bromination of monochlorobenzene according to Equation *d*. Similar reactions may be carried out with other halogens.

In the second step of this particular embodiment of the process, either isomeric mixture A (dibromobenzenes) or isomeric mixture B (bromochlorobenzenes) is reacted with additional benzene. This step may be represented by the following equations:

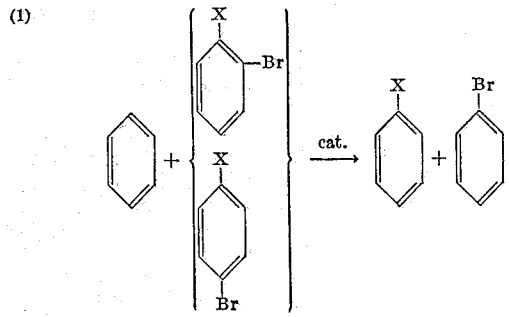

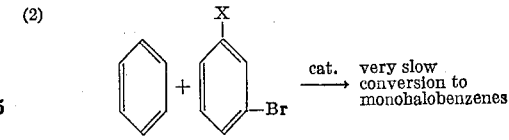

wherein X represents a halogen (F, Cl, Br). The Friedel-Crafts catalyst will normally already be present in the mixture as a result of the initial preparative steps (*a*) through (*d*). Catalyst may be added if necessary (for example, if the catalyst has previously been removed after the preparation of the isomeric mixtures A or B). Any catalyst suitable for the preparation of isomeric bromohalobenzenes may be used. The amount of benzene added should be sufficient to react with all of the ortho-bromohalobenzene and para-bromohalobenzene (stoichiometric amount). Using the isomeric mixtures from step (1), mole ratios of benzene:(para-bromohalobenzene+ortho-bromohalobenzene) of at least 1:1 should be employed, and preferably at least 2:1. The use of very large amounts of benzene is not detrimental to the reaction from the chemical point of view. However, the use of excessive amounts of benzene is disadvantageous from the economic standpoint because of the increase in the amount of material which must be handled in the process. The use of insufficient amounts of benzene may result in incomplete consumption of the ortho and para isomers. This is not necessarily detrimental to product quality, depending on the end use of the product. The transhalogenation step is particularly effective when used on a meta-rich reaction mixture. By "meta-rich," as used herein, is meant a mixture containing isomeric bromohalobenzenes in which at least 50 percent by weight of the isomer mixture is made up of meta-bromohalobenzene (especially meta-dibromobenzene or meta-bromochlorobenzene). For such meta-rich mixtures, from about 2 to 20 moles of benzene per combined mole of ortho-bromohalobenzene plus para-bromohalobenzene is sufficient. In a typical isomer distribution of a bromohalobenzene mixture which corresponds to the thermodynamic equilibrium point of the composition, the amount of meta isomer is about 62–66 percent by weight of the total mixture and the ortho and para content is about 3–5 percent and 29–35 percent, respectively. The molar amount of benzene used for the transhalogenation of this mixture is preferably about 2 to 10 times the combined molar amount of the ortho-bromohalobenzene plus the para-bromohalobenzene. The transhalogenation reaction may be conveniently carried out at room temperatures. Temperatures of from about 0° to 40° C. are generally satisfactory. Above 40° C., tar formation becomes a factor and below 0° C., the reaction is slow. The reaction is not pressure sensitive and is preferably carried out at atmospheric pressure. The time required for the reaction should be sufficient to convert a major proportion or substantially all of the ortho-bromohalobenzene and para-bromohalobenzene to the monohalobenzene. Generally, this time will vary somewhat with the purity of the meta-bromohalobenzene desired, the temperature at which the reaction is carried out, the concentration of the catalyst and the concentration of bromohalobenzene. At temperatures of from about 0° to 40° C. using a mole ratio of catalyst: total moles of aromatic compounds of from about 0.01 to 0.20, the ortho- and para-bromohalobenzene isomers are converted to the monohalobenzene in about 4 to 15 minutes. The time should be sufficient to remove most of the para- and ortho-bromohalobenzenes without destroying all of the desired meta-bromohalobenzene. Reaction times of up to about 24 hours may be used without significant loss of the meta-bromohalobenzene to monohalobenzene. The use of longer reaction times does not lead to any ultimate material losses (the benzene and monohalobenzene is recycled) and, once the ortho- and para-bromohalobenzenes have all reacted, does not increase the purity of the product. Therefore, the use of reaction times longer than necessary for removal of the ortho and para isomers decreases the total efficiency of the process, but does not waste material.

While any catalyst suitable for the preparation of a mixture containing bromohalobenzenes by the reaction of a halogen and benzene (or halobenzene) may be used in the transhalogenation step of the process, Friedel-Crafts catalysts of the following empirical formula are preferred $$MX_n$$

wherein M is a metal such as Al, Fe, Sn, Sb, Zn, etc. of valence $n$ and at least one, X is a halogen atom (especially chlorine or bromine). Examples of suitable catalysts include $FeCl_3$, $FeCl_2$, $AlCl_3$, $AlBr_3$ (or $Al_2Br_6$), $AlCl_2Br$, $SnCl_4$, $SnCl_2$, $ZnCl_2$ and $SbCl_3$. Only a catalytic amount of metal halide is employed. Ordinarily, from 1 to 20 mole percent based on quantity of bromohalobenzene is sufficient. Minor amounts of water or hydrogen halide in the reaction mixture tend to promote the catalytic activity of the Friedel-Crafts catalyst. The reactants used normally contain some moisture and this need not be removed.

The reaction mixture obtained after completion of the transhalogenation reaction of the added benzene with the ortho - bromohalobenzene and para - bromohalobenzene contains meta-bromohalobenzene, monohalobenzene and benzene. The mixture may also contain some 1,3,5-bromodihalobenzene. For most meta-bromohalobenzene compounds, the boiling points are sufficiently different from the other components of the mixture (i.e., the benzene and the monohalobenzene produced in the transhalogenation reaction) to allow separation of the meta-bromohalobenzene by simple distillation techniques. For example, meta-dibromobenzene (boiling point 219° C.) may be easily separated by means of distillation techniques from a mixture of benzene (boiling point 80° C.), bromobenzene (boiling point 155° C.) and isomeric tri-bromobenzenes (boiling points from 276° to 288° C.). Similarly, meta - bromochlorobenzene (boiling point 196° C.) may be separated by distillation from a mixture containing benzene, chlorobenzene, bromobenzene and isomeric dibromochlorobenzenes or bromodichlorobenzenes. The simplicity of this particular method is highly advantageous where large amounts of meta-bromohalobenzene are produced.

The following examples are submitted for the purpose of illustration only and are not to be construed as limiting the scope of the invention in any way.

*Example I*

A 78 gram (1 mole) sample of technical grade benzene was measured into a 500 milliliter flask equipped with a stirrer, dropping funnel and reflux condenser. The flask was immersed in a water-bath at 40° C. From the dropping funnel 320 grams (2 moles) of bromine with 11 grams (0.04 mole) of aluminum bromide dissolved in it was added dropwise to the benzene over a 40 minute period. The mixture was stirred for another 20 minutes (completing the preparation of a mixture containing metadibromobenzene and isomers thereof), then 236 grams (2.5 moles) of benzene was added to the mixture in one portion and stirred for another 10 minutes. The reaction was stopped then by pouring the solution into water and, after separation, the organic layer was washed with water three times. The solution was fractionally distilled after drying with $Na_2SO_4$. The yield of metadibromobenzene was 113 grams (98.7 percent pure with about 1.3 percent para-dibromobenzene).

*Example II*

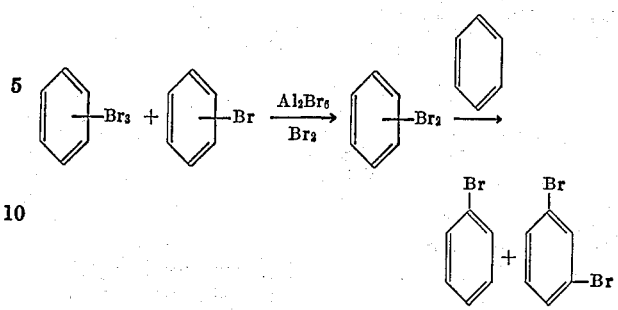

The brown distillation residue (about 38 grams containing mostly tribromobenzenes) and the monobromobenzene fraction (about 140 grams) of the distillation of Example I was stirred in a flask as described above. 130 grams (0.8 mole) of bromine, containing 5 grams of aluminum bromide, was added dropwise to the mixture in the flask in the course of 30 minutes to form a mixture rich in the meta isomer. The reaction was carried further as described in Example I [i.e., a total of 172 grams (2.2 moles) of benzene was added and the mixture stirred for ten minutes followed by pouring the mixture into water and separation of the organic layer]. The yield of meta-dibromobenzene was 103 grams (98 percent pure).

*Example III*

An isomeric mixture (191 grams; 1 mole) of bromochlorobenzenes (40 percent ortho, 6 percent meta and 54 percent para isomers) and 11 grams (0.04 mole) of aluminum bromide was measured into a 500 milliliter flask equipped with a stirrer. The solution was agitated for 60 minutes at room temperature (to produce a meta-rich isomeric mixture), then a total of 236 grams (2.5 moles) of benzene was added to the solution. The catalyst was destroyed after 15 minutes by pouring the solution into water. The yield of meta-bromochlorobenzene was 90 grams (99 percent pure).

I claim as my invention:

1. A process for separating a meta-bromo-substituted benzene from its mixture with a least one of an ortho-bromo-substituted benzene and a para-bromo-substituted benzene, said bromo-substituted benzenes having from 1 to 2 ring substituents in addition to the bromine atom selected from the group consisting of halogen of atomic number 9–35, phenyl, phenoxy, halophenyl, and halophenoxy wherein each halo moiety is halogen of atomic number 9–35, which process comprises contacting said mixture with a Friedel-Crafts catalyst and an aromatic hydrocarbon of 6–15 carbon atoms selected from the group consisting of benzene, lower alkylbenzenes having 1–5 lower alkyl substituents, diphenyl, and naphthalene.

2. A process for the preparation of a meta-bromohalobenzene having the formula

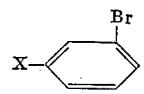

wherein X is a halogen selected from the group consisting of F, Cl and Br, which comprises contacting a mixture containing a meta-bromohalobenzene and at least one bromohalobenzene isomeric therewith with benzene in the presence of a Friedel-Crafts catalyst to convert any isomer of meta-bromohalobenzene to monohalobenzene, and separating the remaining meta-bromohalobenzene from the resulting reaction mixture.

3. The method of claim 2 wherein the meta-bromohalobenzene is meta-dibromobenzene.

4. The method of claim 2 wherein the meta-bromohalobenzene is meta-bromochlorobenzene.

5. A method of preparing meta-bromohalobenzene substantially free of the ortho- and para-bromohalobenzene isomers which comprises:

(a) reacting a compound of the formula

wherein X is selected from the group consisting of F, Br, Cl and H, and bromine in the presence of a Friedel-Crafts catalyst to produce a reaction product rich in meta-bromohalobenzene and containing at least one isomeric bromohalobenzene, (b) carrying out a transbromination reaction by contacting said reaction product (a) with benzene in the presence of a Friedel-Crafts catalyst to convert any ortho- and para-bromohalobenzene to monohalobenzene, and (c) separating meta-bromohalobenzene from the reaction mixture of (b).

6. The method of claim 5 wherein the meta-bromohalobenzene is meta-dibromobenzene.

7. The method of claim 5 wherein the meta-bromohalobenzene is meta-bromochlorobenzene.

8. A method of removing isomers of meta-dibromobenzene from a mixture containing meta-dibromobenzene and at least one isomer thereof which comprises contacting said mixture with an amount of benzene sufficient to react with substantially all of said isomers of meta-dibromobenzene in the presence of a Friedel-Crafts catalyst.

9. The method of claim 8 wherein the Friedel-Crafts catalyst is a metal halide.

10. The method of claim 8 wherein the Friedel-Crafts catalyst is aluminum bromide.

11. A method of preparing substantially pure meta-dibromobenzene which comprises:

(a) contacting a mixture containing meta-dibromobenzene and isomers thereof with a stoichiometric amount of benzene at a temperature of from 0° to about 40° C. in the presence of a Friedel-Crafts catalyst for from about 4 to 15 minutes to convert said isomers of meta-dibromobenzene to monobromobenzene by a transhalogenation reaction with the benzene, (b) adding water to the reaction mixture of (a) to destroy the Friedel-Crafts catalyst and slow the transhalogenation reaction, and (c) distilling the reaction mixture from (b) to obtain meta-dibromobenzene essentially free of any isomeric dibromobenzene.

12. The process of claim 11 wherein the Friedel-Crafts catalyst is aluminum bromide.

13. A method of separating meta-bromofluorobenzene from an isomeric mixture of bromofluorobenzenes which comprises contacting said isomeric mixture with toluene in the presence of a Friedel-Crafts catalyst to remove the bromine atoms which are in the ortho and para positions with respect to the fluorine atom of said bromofluorobenzenes, and subjecting the resulting reaction mixture to distillation to separate the meta-bromofluorobenzene.

References Cited
UNITED STATES PATENTS 3,077,503  2/1963  Crump _____ 260—650

LEON ZITVER, *Primary Examiner.*

H. T. MARS, N. K. KING, *Assistant Examiners.*